(12) United States Patent
Lee

(10) Patent No.: US 7,619,820 B2
(45) Date of Patent: Nov. 17, 2009

(54) DOT MATRIX HOLOGRAMS WITH SPATIALLY VARYING PERIOD

(75) Inventor: Wai-Hon Lee, Los Altos, CA (US)

(73) Assignee: I Win Technology Co., Ltd., Tortola (VG)

( * ) Notice: Subject to any disclaimer, the term of this patent is extended or adjusted under 35 U.S.C. 154(b) by 85 days.

(21) Appl. No.: 11/054,851

(22) Filed: Feb. 9, 2005

(65) Prior Publication Data

US 2006/0176560 A1    Aug. 10, 2006

(51) Int. Cl.
*G02B 5/18* (2006.01)
(52) U.S. Cl. .................. 359/575; 359/569; 359/573
(58) Field of Classification Search .......... 359/567, 359/569, 573, 575, 576; 385/10, 37
See application file for complete search history.

(56) References Cited

U.S. PATENT DOCUMENTS 3,768,888 A * 10/1973 Nishino et al. ............ 359/576
4,991,934 A *  2/1991 Hettrick .................... 359/570
5,058,992 A * 10/1991 Takahashi .................. 359/567
5,561,683 A   10/1996 Kwon
6,404,956 B1 *  6/2002 Brennan et al. ............ 385/37
6,865,319 B2 *  3/2005 Painchaud ................. 385/37
2001/0015851 A1  8/2001 Danziger et al.
2002/0036731 A1  3/2002 Takahashi et al.

FOREIGN PATENT DOCUMENTS

EP    0373700 A1    6/1990
EP    1486830 A2   12/2004

* cited by examiner

*Primary Examiner*—Audrey Y Chang
(74) *Attorney, Agent, or Firm*—Townsend and Townsend and Crew LLP

(57) ABSTRACT

A diffractive unit which can reduce the effect of the nonlinearity of the photo-resist recording material to produce a diffractive device with brilliant color, and describes a method for recording. A cross grating device recorded using the method of this present invention is also described. A diffractive pattern is provided with multiple units, and the period of the diffraction within at least one of the units is spatially varying. It has been discovered that a spatially varying period can offset other effects, such nonlinear characteristics of the material or inter-unit gaps, to reduce the harmonics and improve the color.

6 Claims, 5 Drawing Sheets

DOT MATRIX HOLOGRAMS WITH SPATIALLY VARYING PERIOD

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to the use of diffractive gratings for packaging to produce holographic images, and in particular to improving the color quality of such diffractive gratings.

Diffractive devices are used in graphic design for wrapping papers, package covers, labels to authenticate products and many other applications. These devices diffract light into colorful patterns. These diffractive devices or gratings are often created by recording the interference of two laser beams. One of the most popular patterns used by the packaging industries is a so called rainbow hologram which is actually made by the superposition of two linear interference patterns oriented at 90 degrees with respect to each other. More complicated patterns such as those discussed in U.S. Pat. No. 4,568,141, U.S. Pat. No. 5,032,003 are composed of small diffractive units with varying angles. The period inside each diffractive unit is however, constant and may be modified for each diffractive unit to produce a desired effect. The period inside each unit defines a color for that unit, with the multiple units making up a desired pattern. For example, if one wants to observe red color at angle θ from a diffractive unit, the grating periods inside the diffractive unit must be determined by the equations below:

$$\sin \vartheta = \frac{\lambda_r}{T_r},$$

where $\lambda_r$ and $T_r$ are the wavelength for red color and the corresponding period for the diffractive unit respectively. In recording these diffractive units on a photo-resist recording material, the nonlinear characteristics of the material produce multiple diffractions (second harmonic or sub-harmonic) from the same grating structure. As a result, the light efficiency of the diffractive unit is reduced. Since the diffractive pattern is embossed on a reflective surface, the reduction in the diffractive color will make the pattern appear to be whitish and not colorful.

BRIEF SUMMARY OF THE INVENTION

This invention provides a diffractive unit which can reduce the effect of the nonlinearity of the photo-resist recording material to produce a diffractive device with brilliant color, and a describes a method for recording. A cross grating device recorded using the method of this present invention is also described. A diffractive pattern is provided with multiple units, and the period of the diffraction within at least one of the units is spatially varying. It has been discovered that a spatially varying period can offset other effects, such nonlinear characteristics of the material or inter-unit gaps, to reduce the harmonics and improve the color.

DETAILED DESCRIPTION OF THE INVENTION

Figure 1A:
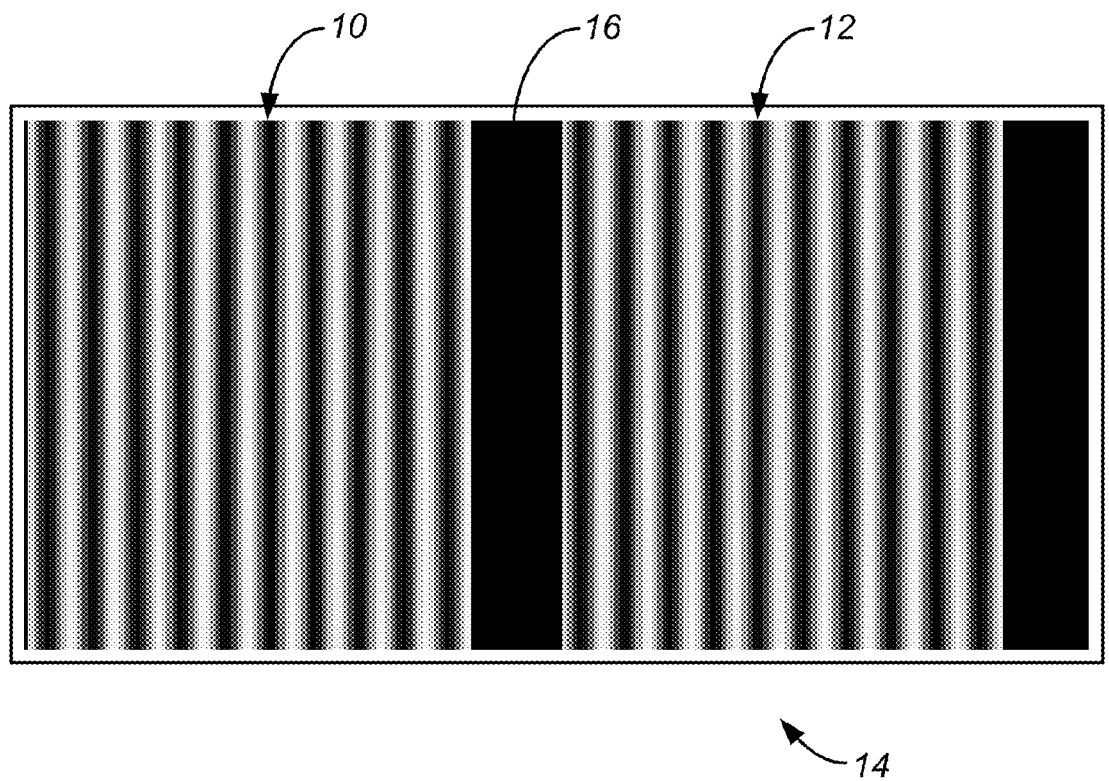
FIG. 1(a). is a diagram of a prior art diffractive pattern with constant period diffractive units.

FIG. 1(a) shows two diffractive units 10 and 12 with constant period T. The two units combined form a simple pattern 14. The units are separated by a small gap 16. The gap is often the result of the variation of the size of the periodic structure with respect to the placement distance of these structures during the recording process. The intensity of the laser beam across the periodic structure is proportional to $$I(x) = 1 + \cos\left(\frac{2\pi x}{T}\right), \tag{1}$$

where T is the grating period. This beam profile is exposed to a plate coated with photosensitive material such as Shipley photoresist. After development, the surface profile of the photoresist plate exhibits the same variation as shown in Eq. (1). This surface relief profile is later transferred to a nickel shim and the shim is subsequently used to emboss the relief pattern on a reflective film. When this film is illuminated by light, the relief pattern modifies the light path or phase. The wavefront of light after reflecting from the film is proportional to $e^{i\phi(x)}$, where φ(x) is proportional to I(x).

Figure 1B:
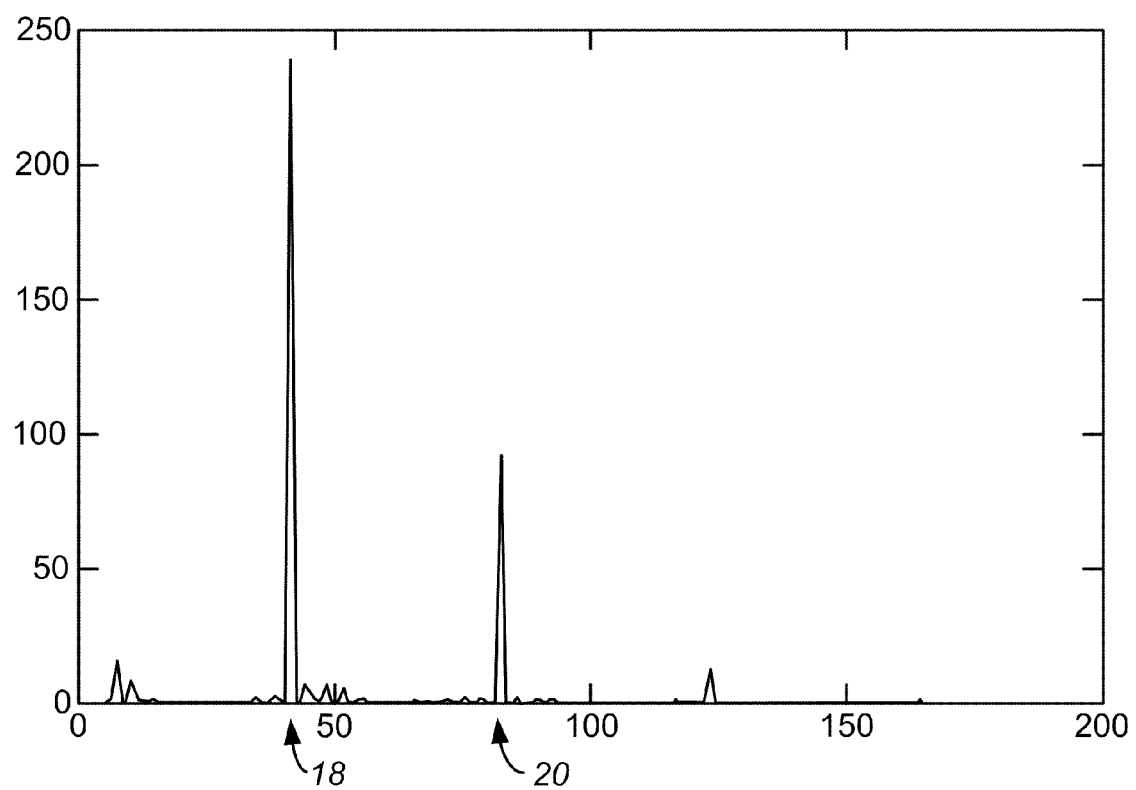
FIG. 1(b) is a diagram of the spectrum of the prior art diffractive pattern of FIG. 1(a).

The diffraction pattern from the film contains more than one diffractive order as shown in FIG. 1(b). The first diffracted wave 18 is the result of the period T and the second diffracted order 20 is the second harmonic of the period T due to the nonlinear nature of recording. Often the gaps between the diffractive units also produce diffracted orders near the first diffracted order. All these diffracted orders reduce the efficiency in the first diffracted order and make the color spectrum from diffraction dim and low in contrast.

Figure 2A:
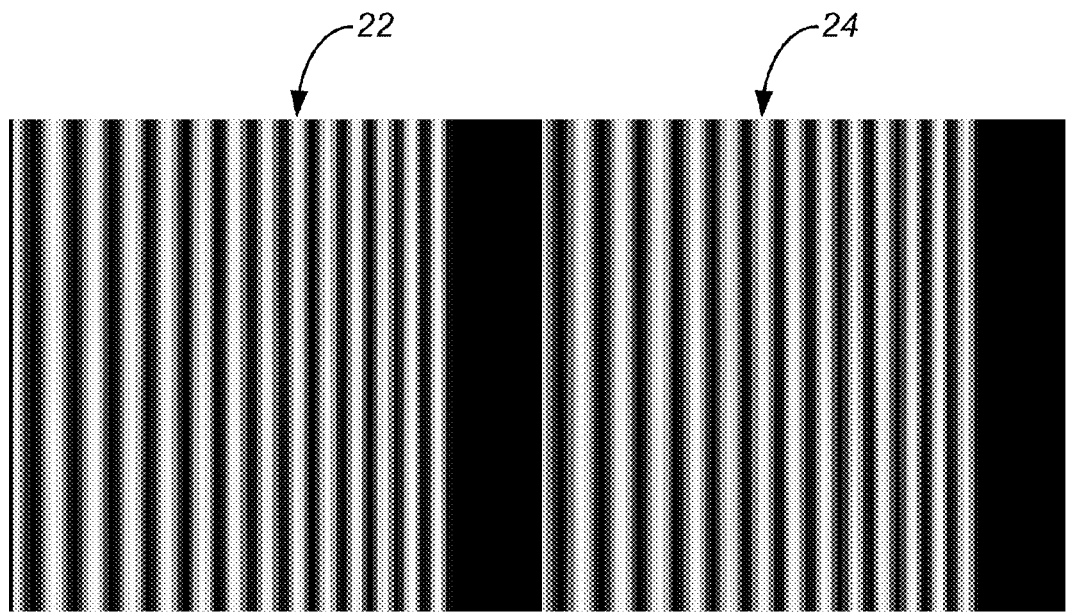
FIG. 2(a) is a diagram of a diffractive pattern on a substrate having diffractive units with spatially varying periods according to the invention.

FIG. 2(a) shows two diffractive units 22 and 24 which have spatially varying period. These form a simple pattern 26 on a piece of packaging. It is clear that the period on the left hand side of each unit is larger than that on the right hand side. The beam profile to create such a spatially varying diffractive unit is $$I_1(x) = 1 + \cos\left(\frac{2\pi(x + ax^2)}{T}\right), \quad (2)$$

where a is a parameter controlling the amount of variation of the spatial period change.

Figure 2B:
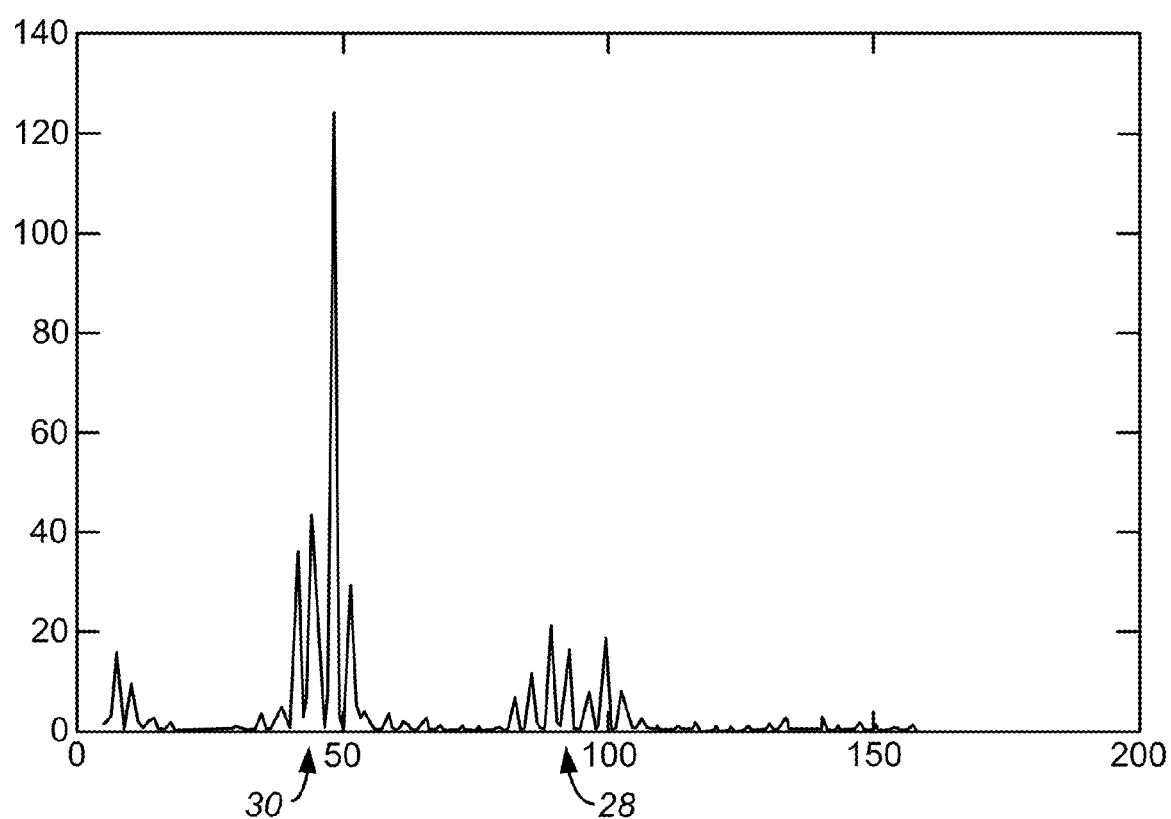
FIG. 2(b) is a diagram of the spectrum of the diffractive pattern of FIG. 2(b).

The diffraction pattern of a film having this type of diffractive units is shown in FIG. 2(b). As can be seen, the diffraction in the second order 28 is reduced relative to the first order 30.

Figure 3A:
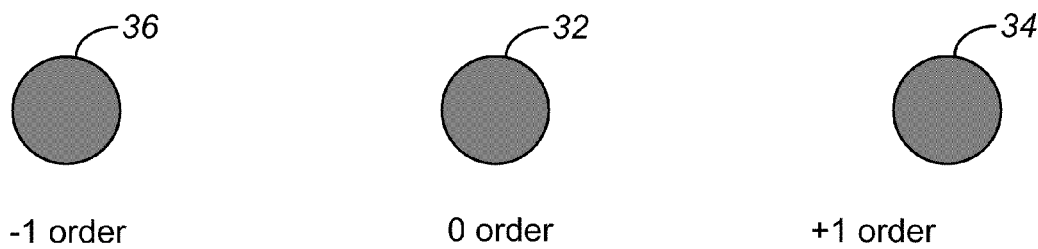
FIG. 3(a) is a diagram of a prior art two dimensional spectrum of a constant period grating.

FIG. 3(a) illustrates a two dimensional diffraction from a constant period structure when it is illuminated by a laser beam. The beam 32 in the center is the zero order and the beams 34, 36 on either side are the +1 and −1 diffracted order respectively. The diffracted beams are circular in shape.

Figure 3B:
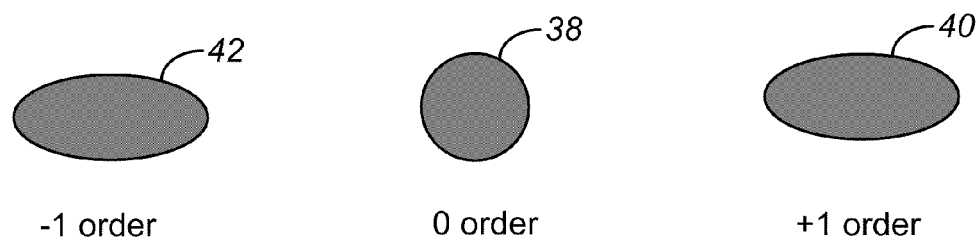
FIG. 3(b) is a diagram of a two dimensional spectrum of a spatially varying grating according to the present invention.

FIG. 3(b) shows the diffraction pattern from a spatially varying diffractive unit. The zero order 38 is still circular in shape. However, the +1 and −1 diffractive orders 40 and 42 are elliptical in shape.

Figure 4A:
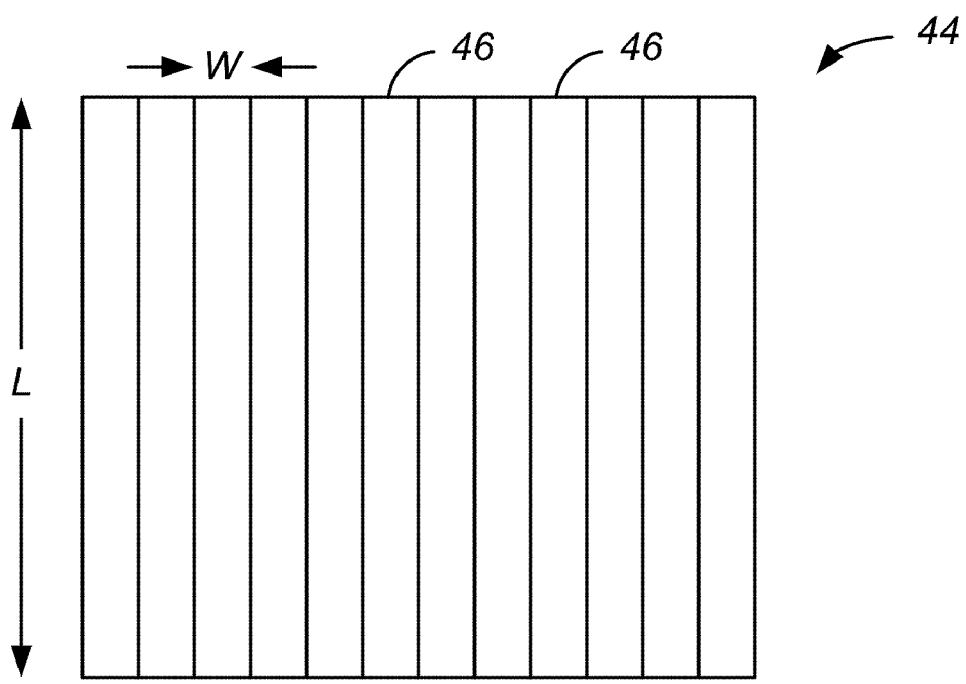
FIG. 4(a) is a diagram of a linear grating composed of rectangular gratings with spatially varying periods.

FIG. 4(a) shows a one directional grating structure consisting of multiple diffractive units 46. Each diffractive unit has width W and length L. The period inside each diffractive structure has a spatially varying period.

Figure 4B:
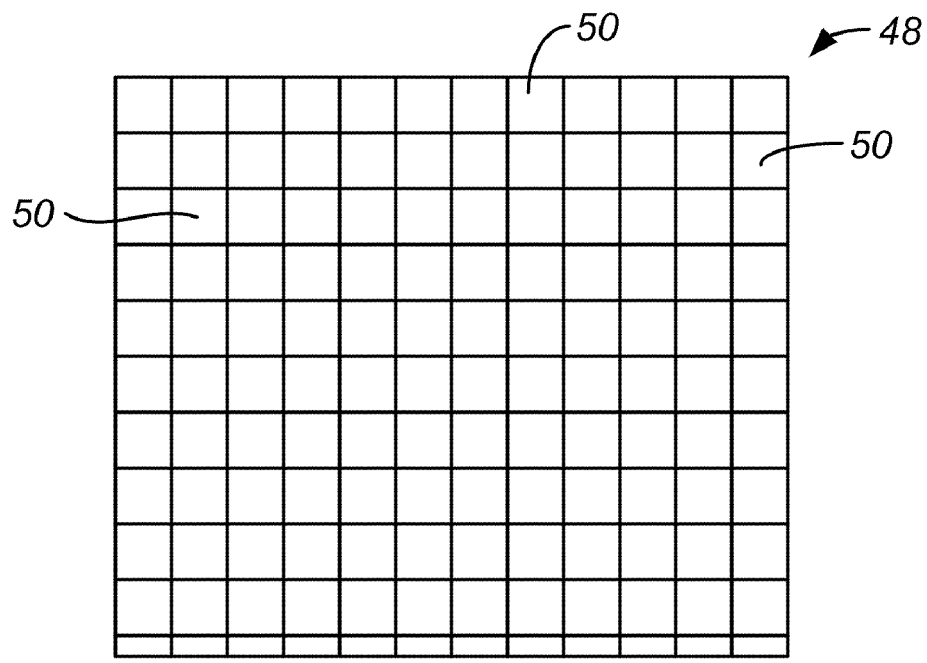
FIG. 4(b) is a diagram of a cross grating composed of rectangular gratings with spatially varying periods.

FIG. 4(b) shows a cross grating structure 48 formed by superimposing two one directional grating structures as shown in FIG. 4(a) on the same photosensitive layer, to produce a number of units 50. This structure can diffract light in eight directions separated by 45 degrees.

In one embodiment, for a unit or cell with width W and length L, the change of the spatial frequency, $\Delta f$ (lines/mm), within the grating cell is greater than 1/W (lines/mm) or 1/L (lines/mm). In other words, the larger the grating cell the smaller the spatial frequency change. In one embodiment, the spatially frequency varies linearly from one side to the other of the unit or grating cell.

It will be understood that modifications and variations may be effected without departing from the scope of the novel concepts of the present invention. For example, the pattern could be composed of irregularly shaped units, such as curved units forming a pattern of an eagle. Alternately, more than two directions of diffraction patterns could be included. The spatially varying diffractive patterns could be in some or all units, in some or all directions. The diffraction pattern of the present invention may be created by any of a plurality of processes and apparatus. An example of an apparatus for creating a diffraction pattern is set forth in U.S. Pat. No. 6,775,037, the disclosure of which is hereby incorporated herein by reference. Accordingly, the foregoing description is intended to be illustrative, but not limiting, of the scope of the invention which is set forth in the following claims.

What is claimed is:

1. An article of manufacture comprising:
   a plurality of diffractive units, each of said diffractive units having a grating period that defines a color for that unit;
   at least one of said diffractive units being a first unit having a diffraction pattern with a spatially varying grating period within said unit, said spatially varying grating period being proportional to $I_1(x)=1+\cos(2\pi(x+ax^2)/T)$, where $I_1$ is the intensity of light used to write said pattern, x is the position in the direction across the periodic structure of said diffractive unit, T is a nominal period and where "a" is a non-zero parameter controlling the amount of variation of the spatially varying grating period.

2. The article of claim 1 wherein said diffraction pattern is a one directional diffractive pattern.

3. The article of claim 1 wherein said diffraction pattern is a two directional diffractive pattern.

4. The article of claim 3 wherein said first unit has diffraction patterns in two directions, and at least one of said diffraction patterns has said spatially varying period.

5. The article of claim 1 wherein said plurality of diffractive units have varying sizes, wherein a largest of said units has a first variation in period of a diffraction pattern within said largest unit and wherein a smallest of said units has a second variation in period of a diffraction pattern within said smallest unit, said first variation being smaller than said second variation.

6. A method for of manufacturing an article, comprising:
   forming a plurality of diffractive units, each of said diffractive units having a diffractive pattern that defines a color for that unit;
   forming at least one of said diffractive units as a first unit having a spatially varying grating period within said unit, said spatially varying period being proportional to $I_1(x)=1+\cos(2\pi(x+ax^2)/T)$, wherein $I_1$ is the intensity of light used to write said pattern, x is the position in the direction across the periodic structure of said diffractive unit, T is a normal period and where "a" is a non-zero parameter controlling the amount of variation of the spatially varying grating period.

* * * * *

UNITED STATES PATENT AND TRADEMARK OFFICE
CERTIFICATE OF CORRECTION

| | | |
|---|---|---|
| PATENT NO. | : 7,619,820 B2 | Page 1 of 1 |
| APPLICATION NO. | : 11/054851 | |
| DATED | : November 17, 2009 | |
| INVENTOR(S) | : Wai-Hon Lee | |

It is certified that error appears in the above-identified patent and that said Letters Patent is hereby corrected as shown below:

At Column 4, line 45, replace [[normal]] with --nominal-- so that line 45 reads:

--unit, T is a nominal period and where "a" is a non-zero--

Signed and Sealed this

Twenty-sixth Day of January, 2010

David J. Kappos
*Director of the United States Patent and Trademark Office*